United States Patent [19]

Bates

[11] 4,167,685

[45] Sep. 11, 1979

[54] ELECTRICAL MACHINE COMMUTATOR ARRANGEMENT HAVING SHAPED CONDUCTIVE SEGMENTS FOR REDUCED SPARKING

[75] Inventor: James J. Bates, Shrivenham, England

[73] Assignee: National Research Development Corporation, London, England

[21] Appl. No.: 801,996

[22] Filed: May 31, 1977

Related U.S. Application Data

[63] Continuation of Ser. No. 583,401, Jun. 3, 1975, abandoned.

[30] Foreign Application Priority Data

Jun. 10, 1974 [GB] United Kingdom ............... 25623/74

[51] Int. Cl.$^2$ ............................................. H02K 13/04

[52] U.S. Cl. .................................... 310/237; 310/220; 310/247

[58] Field of Search ............... 310/233, 237, 219, 230, 310/232, 220, 221, 236, 235, 247, 248, 253, 234, 251, 252, 72

[56] References Cited

U.S. PATENT DOCUMENTS

| | | | |
|---|---|---|---|
| 1,292,110 | 1/1919 | Simpson | 310/237 |
| 2,297,464 | 9/1942 | Fleischman | 310/236 |
| 3,514,654 | 5/1970 | Moresi | 310/237 |
| 3,521,101 | 7/1970 | Arora | 310/237 |
| 3,590,300 | 6/1971 | Moberly | 310/248 |
| 4,019,076 | 4/1977 | Bates | 310/233 |

FOREIGN PATENT DOCUMENTS

| | | | |
|---|---|---|---|
| 1154609 | 6/1969 | United Kingdom | 310/333 |

*Primary Examiner*—R. Skudy
*Attorney, Agent, or Firm*—Cushman, Darby & Cushman

[57] ABSTRACT

Commutator segment shapes are derived, in relation to machine parameters, for which the current density over the trailing edge of the brush is maintained constant, to prevent sparking. The preferred shape is such that the area of contact between the segment and a linear brush increases initially in a single step to half the total area and subsequently increases progressively more slowly; in an alternative shape, the subsequent rate of increase is linear. Suitable brushes to maintain uniform contact in crossing segment boundaries are preferably of the carbon-fibre type.

8 Claims, 6 Drawing Figures

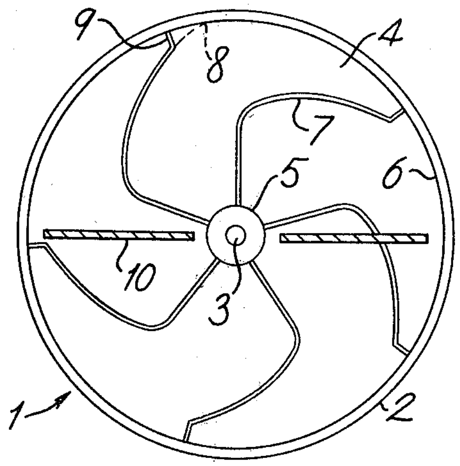
Fig. 1
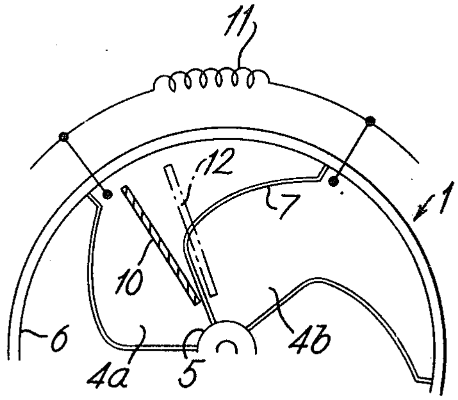
Fig. 2
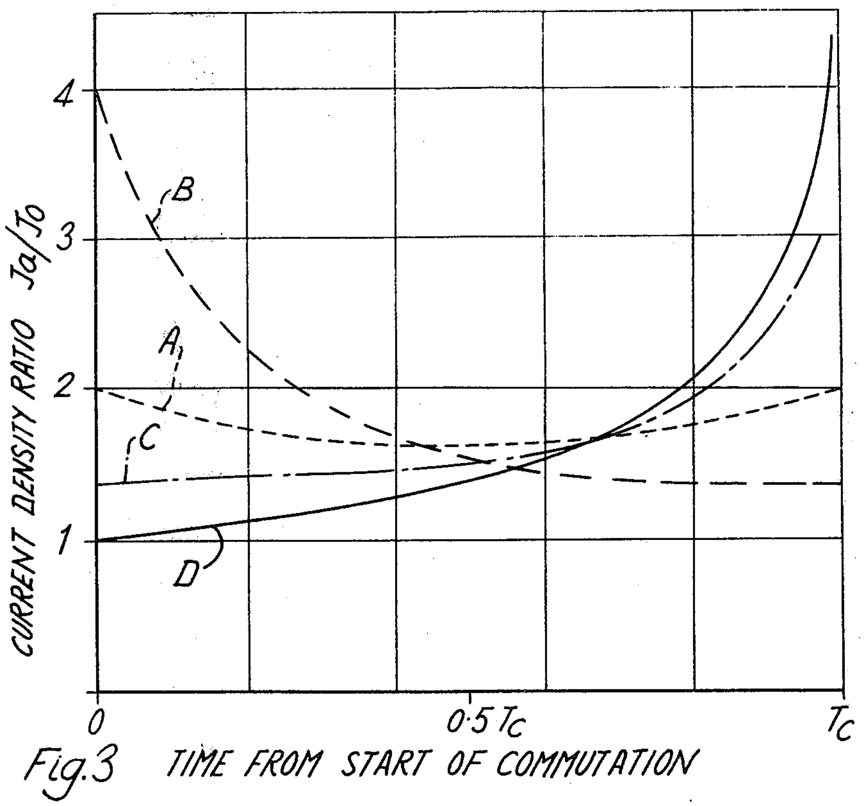
Fig. 3 TIME FROM START OF COMMUTATION

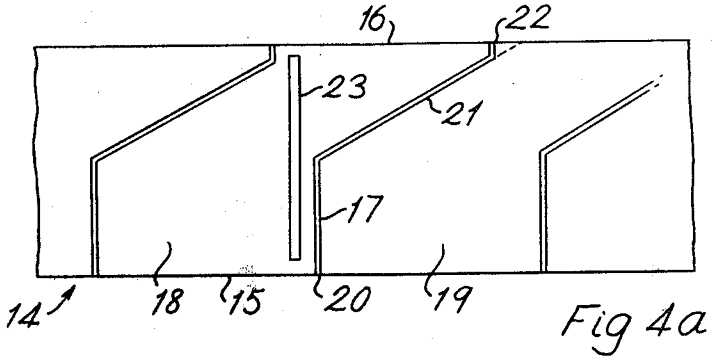
Fig 4a
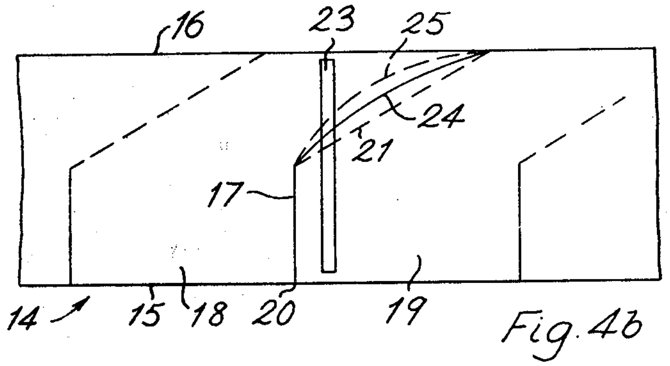
Fig. 4b
Fig. 5
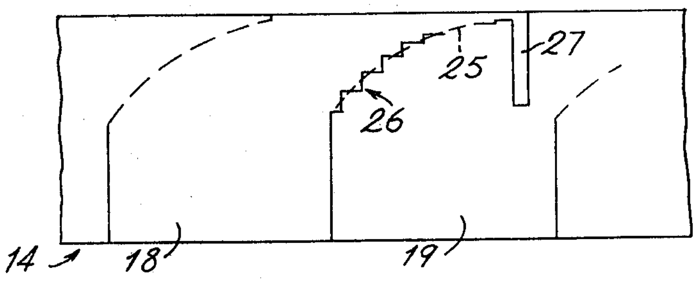

ELECTRICAL MACHINE COMMUTATOR ARRANGEMENT HAVING SHAPED CONDUCTIVE SEGMENTS FOR REDUCED SPARKING

This is a continuation of application Ser. No. 583,401 filed June 3, 1975, now abandoned. This invention relates to commutators for use in electrical machines and has particular application in fractional-horse-power machines employing carbon-fibre brushes.

The purpose of commutation is to reverse the direction of current flow in the successive coils of an armature winding as these coils move past a certain point and so maintain constant direction of current flow in that part of the armature winding that lies to the right of this point and constant direction of current flow in that part of the armature winding that lies to the left of this point. The armature windings are connected to a series of closely-spaced conductive segments mounted on the armature shaft so that sliding contact is made with a brush in the form of a carbon block connected to the external circuit. The segment with which the brush is in contact at any moment then becomes the point of reference for the process of current reversal. The segments are usually mounted on the cylindrical surface of a drum in which case the insulating boundaries of the segments are straight lines parallel to the axis of rotation. Alternatively the commutator may comprise a faceplate lying in a plane normal to the axis of rotation in which the boundaries of the segments are radial lines.

As the armature rotates the brush makes contact alternately with a single segment and then with that segment and the succeeding one simultaneously. During the second of these periods, it should ideally be arranged that the current density at the trailing edge of the brush is always held below a critical level at which sparking will occur and falls to zero before contact is broken. One of the factors determining these conditions is the rate of change of contact resistance between the brush and each of the two segments. In the use of a conventional solid carbon brush the resistance depends on contact at a few randomly distributed points on the brush surface and it is not possible to control the rate of change with any precision. A carbon fibre brush however (or other type of brush having flexible elements) has many uniformly distributed points of contact so that the resistance of the brush varies to a much more precise degree in inverse proportion to its area of contact. It then becomes practicable and is an object of the invention to control the change of resistance so as to optimise the current density at the brush face.

According to a first aspect of the invention a commutator comprises a plurality of conductive segments electrically isolated from each other and each shaped so that when the commutator rotates in a predetermined direction and a brush bears uniformly thereon the area of contact between the brush and a segment increases initially in a substantially stepwise manner and increases subsequently at a mean rate which progressively declines.

According to a second aspect of the invention a commutator comprises a plurality of conductive segments electrically isolated from each other and each shaped so that when the commutator rotates in a predetermined direction and a brush bears uniformly thereon the area of contact between the brush and a segment increases initially in a substantially stepwise manner and subsequently in a substantially linear manner.

Preferably in each case the initial stepwise increase in the area of contact lies in the range 0.25 to 0.75 of the maximum area of contact.

An electrical machine incorporating a commutator according to the first aspect of the invention may be so arranged that, for a designated speed of rotation, the mean current density over the area of contact between the trailing edge of the brush and a segment during commutation is substantially constant.

An electrical machine incorporating a commutator according to the second aspect of the invention may be so arranged that, for a designated speed of rotation, the initial and final values of current density over the area of contact between the trailing edge of the brush and a segment during commutation are substantially equal.

Embodiments of the invention and its manner of operation will now be described with reference to the accompanying drawings in which:

FIG. 1 is a diagrammatic representation in end-elevation of a face-plate commutator according to one aspect of the invention;

FIG. 2 is a diagrammatic representation of a portion of a face-plate commutator of the kind shown in FIG. 1, connected to an associated winding;

FIG. 3 is a graph showing the variation of brush current-density during commutation in relation to commutator segment shape;

FIG. 4 is a diagrammatic representation of the form of commutator segments according to a further aspect of the invention;

FIG. 5 is a diagrammatic representation of modifications to the segment forms of FIG. 1 or FIG. 4.

Figure 6:
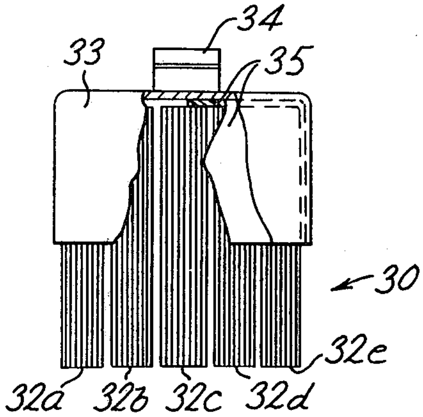
FIG. 6 is a diagrammatic representation of a carbon-fibre brush for use with commutators of the kinds shown in FIGS. 1 to 5.

Referring to FIG. 1 a face-plate commutator 1 comprises a disc 2 of insulating material arranged for mounting by a central hole 3 on a spindle of a fractional horse-power motor (not shown). Five segments 4 of conducting material applied to the surface of the disc 2 are arranged uniformly about the central hole 3 between the inner and outer edges 5 and 6 of the effective area of the disc. 2. The segments 4 are electrically isolated from each other but are closely spaced and complementary in profile, each adjacent pair of segments 4 being separated by an insulating boundary 7. Each boundary 7 extends radially outwards from edge 5 for half the distance between the edges 5 and 6 and continues smoothly in a clockwise direction on a curve which terminates at edge 6 at a point 8 displaced by 60° from the initial radial direction. The radial position of any point on the curve is linearly related to its angular displacement from the initial radial direction. From a point 9 on the edge 6, which is 10° anticlockwise of the point 8, a radial cut is made to remove a small area of conductor between the boundary 7 and edge 6. Each shaded area 10 represents strictly only the contact area of an inclined carbon fibre brush (not shown), having its major dimension in a radial direction between the edges 5 and 6, but for convenience will be used to refer to the brush itself. The brush dimensions are such that during the rotation of the commutator 1 the contact area of the brush 10 is confined momentarily to each of the segments 4 in turn and at no point during rotation extends to more than two of the segments 4. For a commutator 1 of 2.5 cms diameter the dimensions of the contact area of the brush 10 are 0.8 cm×0.2 cm. The form of the segments 4 prevents the use of the commutator 1 other than in anticlockwise rotation but it will be understood that the form of the segments 4 may similarly be designed to accommodate clockwise rotation.

The face-plate commutator is particularly convenient in that its dimensions are not determined by the size of the motor and may be chosen to provide any required degree of resolution of the segment pattern in relation to the size of brush.

A cylindrical commutator may equally well have a segment pattern modified in a manner analogous to that for the face-plate type. In each case it is envisaged that the pattern would be prepared by techniques known in the manufacture of printed-circuit boards.

It is necessary in order to appreciate the derivation of the segment patterns described in this specification to consider briefly the mechanism of commutation. Referring now to FIG. 2, a basic machine is shown in which two adjacent segments 4*a* and 4*b* of a commutator 1 are connected to a section 11 of a closed armature winding. A radially mounted carbon-fibre brush 10 is shown in full contact with the segment 4*a* during anticlockwise rotation of the commutator 1 at the instant before the brush 10 makes contact with segment 4*b*. The current in the segment 4*a* at that instant will be referred to as I and the steady current density over the full area of the brush 10 as Jo. The brush 10 is in full contact with segment 4*a* only within a narrow sector of the commutator 1, the time for the brush 10 to pass from this position to the corresponding position in segment 4*b* being the commutation time Tc. The varying current density over a reducing contact area between the brush 10 and segment 4*a* during the commutation time Tc is referred to as Ja. The inductance of the winding 11 is referred to as L and the contact resistance for the full area of the brush 10 as R.

It is understood throughout that the term 'resistance' as applied to the contact between a carbon brush and a conducting surface in a current-carrying circuit refers to the incremental ratio of voltage drop to current and takes no account of any standing voltage drop.

It is characteristic of a material such as carbon fibre used for the brush 10 that uniform contact is maintained on a microscopic scale, which is less likely to be achieved with a conventional solid brush. As the commutator rotates the resistance R of the brush 10 is therefore redistributed between the segments 4*a* and 4*b* in inverse portion to the respective areas of contact and if the inductance L were absent the current I would be redistributed correspondingly between the segment 4*a* and 4*b* in direct proportion to the respective areas of contact. The effect of the inductance L is to delay both the decay of the current to segment 4*a* and the growth of current to segment 4*b*. Clearly if the rate of rotation is high the area of contact with segment 4*a* will decrease rapidly while the current to that segment is decreasing slowly and undesirably high values of the current density Ja will result. Generally the rate or rotation will be chosen so that the commutation time Tc is at least comparable with the inductive time constant T which is equal to the ratio L/R, the resistance of the winding 11 being assumed negligible.

Computations have been made of the values of Ja/Jo during the commutation period Tc for various shapes of segment and the results are shown graphically in FIG. 3. Curve A refers to the shape of segment in the embodiment of FIGS. 1 and 2 in which the initial radial step is half the total radial distance between edges 5 and 6. If this ratio is denoted as $r=0.5\ r_o$ then by the same convention:

curve B refers to the condition $r=0.75\ r_o$;

curve C refers to the condition $r=0.25\ r_o$; and curve D refers to the condition $r=0$ in which there is no initial step and the boundary begins to curve immediately.

The curved portion of the boundary in each case follows the same law by which radial and angular displacement are linearly related and in each case the time constant T is equal to Tc.

Referring again to FIG. 2 we consider the conditions arising when the brush 10 is carried from its initially shown position to a position 12 only just across the boundary 7 from segment 4*a* to segment 4*b*. One half of the area of the brush 10 (the leading edge) is now in contact with segment 4*b* while the other half (the trailing edge) remains in contact with segment 4*a*. Instantaneously while there is no growth of current in segment 4*b*, the current I in segment 4*a* remains at its full value and the current density Ja therefore rises to 2 Jo. This condition corresponds in FIG. 3 to the initial value $(Ja/Jo)=2$ for curve A. The derivation of the initial values of Ja/Jo for other segment profiles may be similarly demonstrated, the relationship being simply expressed as $(Ja/Jo)_1=1/(1-r/r_o)$. It will be appreciated that the current density at the leading edge of the brush 10 can never exceed Jo; the problem to be solved is to restrict the value of Ja/Jo at the trailing edge to a safe level.

It is clear that in general a slow change in segment profile allows Ja/Jo to remain low early in the commutation period but at the cost of higher values at the point of breaking contact; a steep radial step, for example $r=0.75\ r_o$; must cause an initially higher value of Ja/Jo but allows low values later in the period and is therefore to be preferred to either of the conditions $r=0$ or $r=0.25\ r_o$. Even when the ratio T/Tc rises to 2 and 3 excessive current density is avoided by using the condition $r=0.75\ r_o$.

It can be shown that the current density at the end of the commutation period is defined by the expression $(Ja/Jo)_2=1/[-(T/Tc)(1-r/r_o)]$ and therefore tends to very high values as $(T/Tc)(1-r/r_o)$ approaches unity. Higher values of the radial step are therefore appropriate to higher values of T/Tc in order to limit the value of $(Ja/Jo)_2$.

For a value of T/Tc which does not exceed unity however the segment shape in which $r=0.5\ r_o$ provides the most useful performance of the designs considered, the initial and terminal values of Ja/Jo being equal at a satisfactorily low level. It has been demonstrated in experimental trials that the power rating and the rotational speed of a particular size of motor can be doubled without increasing the terminal current by employing a segment design of the curve A type instead of either a conventional radial type or a curve D type.

It will be understood that although some members of a particular family of segment shape have been shown as preferable to others in discussing the curves of FIG. 3, that aspect of the invention which has been described with reference to FIGS. 1, 2 and 3 is not limited to these members or to this family; it extends to all cases in which the contact area between the brush and a segment initially increases in a stepwise manner, and then continues to increase in any manner which, having regard to the scale of construction, is effectively linear.

This class of segment has been found to give substantial advantages in operation over the conventional form while being simple in construction. The preceding discussion however provides the basis for considering a broader aspect of the invention in relation to FIGS. 4(*a*) and 4(*b*). As an analogue of the face-plate commutator of FIG. 1, part of the developed surface of a cylindrical commutator 14 is shown in FIG. 4(*a*). If the axial distance between the end faces 15 and 16 is now taken to be $r_o$, the portion 17 of the insulating boundary between adjacent segments 18 and 19 extends from a point 20 at the end 15 in an axial direction for a distance r. The boundary then follows a linear path 21 at an angle to the axis to reach the end face 16 at a point 22 within the root width of the segment 19. If $r/r_o=0.5$ and the speed of rotation is such that $T/Tc=1$ then curve A of FIG. 3 is applicable. This curve indicates that initial and terminal values of the current density ratio Ja/Jo are equal but that at intermediate points Ja/Jo is reduced.

The possibility therefore arises that the machine efficiency could be improved by arranging that Ja/Jo should remain uniform over the whole period of commutation. This result is achieved as is indicated in FIG. 4(*b*) by locally reducing the area of the segment 18 to be swept by the brush 23 after passing the boundary 17 so that the current density must be increased. The necessary reduction in area is obtained by changing the path of the linear boundary 21 to a convex form 24. It can be shown that the coordinates (x,y) of any point on the required curve 24, y being measured axially from an origin at point 20, are given by the expression $$y^2=(r/r_o)^2+[1-(r/r_o)^2]x \qquad (1)$$

Assuming, as before, that the commutating winding 11 (FIG. 2) is of negligible resistance a segment having a step 17 followed by a curve 24 gives constant current density during commutation at a speed such that $$T/Tc=(2r/r_o)/[1-(r/r_o)^2]\text{tm} \qquad (2)$$

Thus for $r/r_o=0.5$ the segment form of FIG. 4(*a*) would follow curve A of FIG. 3 to give a maximum current density $Ja/Jo=2$ for a speed such that $T/Tc=1$; for the same value of $r/r_o$ the boundary 24 of FIG. 4(*b*) would give constant current density $Ja/Jo=2$ at a speed such that $T/Tc=4/3$, hence enabling speed to be increased safely by 33%. As an indication of the dimensional difference between the paths 21 and 24, for an axial length of 25 mm the maximum deviation is about 1 mm corresponding to a reduction in the axial dimension of the segment 18 at this point by 15%.

The designer is therefore enabled, as a first approximation, to derive the value of $r/r_o$ for which current density is constant by inserting in equation (2) the value of the time constant T for the part of the machine winding being commutated, and a designated speed of rotation. From this value of $r/r_o$ the corresponding curve 24 can be constructed by applying equation (1).

The resistance of the winding 11 (FIG. 2) has so far been assumed negligible but in practice the resistance is significant and a correction must be made for the consequential decrease in the time constant T. It can be shown that the effect is to enable the narrowing portion of the segment 18 to be further reduced, while maintaining constant current density at a selected speed.

A general design procedure not hitherto available has been derived and is set out in the following steps 1 to 9. The procedure enables a revised boundary 25 to be determined taking into account winding resistance and other machine circuit parameters.

The segments 18 and 19 are assumed to be connected across a winding 11 as was shown in FIG. 2.

1. A value is nominated for the current density Ja, at the trailing edge of the brush, to be maintained in the segment 18 during commutation at a level just below the density which is found to cause sparking.

2. A step ratio $r/r_o=a$ is chosen for the preliminary computation.

3. In the segment 19, during commutation on segment 18, the initial current density at the leading edge is zero and the final current density $Jo=Ja(1-a)$. The voltage drop V between a brush (of width$=r_o$ and uniform thickness) and the segment material is established experimentally for the current densities $O(V_1)$, $Jo(V_2)$ and $Ja(V_3)$. A factor R analogous to differential resistance is then determined graphically as $(V_2-V_1)/Jo\cdot r_o$.

4. The inductance L of the winding 11 is determined to give the time constant $T=L/R$.

5. The resistance Rw of the winding 11 is determined, to give a ratio $R_1=Rw/R$.

6. The voltages which arise to assist or oppose commutation are (i) $E_o=V_3-V_1$ (ii) A voltage of net value E acting in the commutating coil 11.

This value may be positive if the opposing effect of self-induction is overcome by rocking the brushes into the magnetic field of a machine but may be negative for some modes of operation and some types of machine. If the current to be commutated is I a value is derived for $$e=(E_o\pm E)/RI$$

7. To simplify the relationships we set:

$$c=(1+a)R_12+(1-a)e-1$$

$$d=(c^2+4aR_1)^{\frac{1}{2}}$$

Then the coordinates $X_1,y_1$ of a point on the curve 25 are given by the expression:

$$x_1=\frac{(c/d)\log_e\left[\frac{(d+2R_1y_1-c)(d-2R_1a+c)}{(d-2R_1y_1+c)(d+2R_1a-c)}\right]-\log_e\left[\frac{R_1y_1^2-cy_1-a}{R_1a^2-ca-a}\right]}{(c/d)\log_e\left[\frac{(d+2R_1-c)(d-2R_1a+c)}{(d-2R_1+c)(d+2R_1a-c)}\right]-\log_e\left[\frac{R_1-c-a}{R_1a^2-ca-a}\right]} \qquad (3)$$

which may be represented by the form:

$$x_1=\frac{(c/d)\log_e[A]-\log_e[B]}{(c/d)\log_e[C]-\log_e[D]}$$

8. Equation (3) defines the segment shape for which Ja is held constant at a speed for which:

$$\frac{T}{Tc} = \frac{2R_1}{(c/d)\log_e[C] - \log_e[D]} \quad (4)$$

9. It may be found that for initially chosen values of ro and a there is no solution to equations (3) and (4) and it is necessary to repeat the calculation on a trial and error basis until satisfactory values of ro and a have been found.

A further possibility which may be considered in step (3) is that the segment material may be made non-uniform in resistance. Alternatively, the normally desirable property of a brush constructed from carbon-fibre or other flexible elements, that its contact resistance varies in precise inverse ratio to contact area, may be modified. It is considered to be further advantage if the resistance of the brush is made as low as possible in the leading edge which makes the first contact with a segment and is relatively higher elsewhere. Referring to FIG. 6, a carbon-fibre brush 30 comprises a row of uniform tufts 32*a* to 32*e* of fibre secured in a conductive brush-casing 33 having a mounting and connecting point 34 for external wiring. In use the brush 30 is mounted so that the fibre tufts near the end-tuft 32*a* form the leading edge and those near the end 32*e* the trailing edge. The fibres in the portion of the brush 30 nearest the end 32*a* are arranged to make contact directly with the conductive brush casing 33. The fibres near the end 32*e* are however prevented, by an insulating layer 35 which lines that end of the casing 33, from making direct contact with the casing 33. The current path through the brush 30 from the area near the end 32*e* to the opposite end of the casing 33 is therefore dependent on lateral contact between fibres, for which the resistance is much higher than that along the fibres.

A segment shape has been derived for a cylindrical commutator, and illustrated in FIG. 4(*b*), which permits the highest possible speed at a uniform current density. The boundary equation may of course be transformed in radial coordinates for a face-plate commutator, a basic machine incorporating the commutator then appearing closely similar to that shown in FIG. 2 with the boundary 7 modified to satisfy the equation of the boundary 25 shown in FIG. 4(*b*). It has been found that the surface condition of the segment 19 differs between the area swept by the brush 23 after crossing the inclined insulating boundary 25 and the area swept by the brush 23 after crossing the step boundary 17. The surface condition appears to be correlated with brush-wear and this can be made more uniform and brush-like extended by constructing the boundary 25 as a series of small step-boundaries. FIG. 5 indicates such a stepped boundary 26 for which the curve 25 represents a mean position.

FIG. 5 also shows as an extension of the segment 18 a narrow strip 27 extending axially from the edge 16 to form a spur from the boundary 25. The purpose of the strip 27 is to reduce the effect of any tendency for sparking to occur as the trailing edge of the brush 23 leaves the segment 18 by distributing the current at this position over a larger area. The strip 27 may be typically equal in width to the brush 23 and between one-third and one half of the length of the brush 23.

Modifications similar to the stepped boundary 26 and the strip 27 of FIG. 5 could equally be applied to the boundaries, such as the linear part of the boundary 7, of the segments of the commutator of FIG. 1.

In the most general terms the invention is directed to the construction of forms of commutator, and of machines incorporating them, having the ability to reverse a given current in the minimum time, and hence at the highest speed, without sparking. This ability is secured according to one aspect of the invention by shaping the commutator segments so that the current density over the trailing edge of the brush is maintained at a substantially constant value just below the limit at which sparking commences. A segment shape which enables this ideal condition to be closely approached has been described with reference to FIG. 4 and a shape of practical value for which the ideal condition may be approximated has been described with reference to FIGS. 1, 2 and 3.

I claim:

1. A rotatable commutator comprising:

a plurality of conductive segments separated from one another by insulating boundaries, at least one elongated rectangular brush extending in a direction normal to the direction of rotation of the commutator, said brush uniformly bearing on said segments and arranged such that said brush at no time contacts more than two segments simultaneously, and inductance means interconnecting adjacent segments, said inductance means having an inductive time constant during commutation which is at least substantially comparable to the time required for said brush to pass from a given position on one of said segments to a corresponding position on an adjacent one of said segments as the commutator rotates in a predetermined direction, each said insulating boundary having a first boundary portion extending in a direction normal to the direction of commutator rotation and a second boundary portion departing from the direction of said first boundary portion and extending to a point angularly displaced from the direction of said first boundary portion whereby said commutator rotation brings said brush into contact with said adjacent segment initially by passing over the first boundary portion to increase the area of contact between said brush and said adjacent segment in a substantially stepwise manner and subsequently by passing over the second boundary portion to increase said area of contact at a mean rate which progressively declines.

2. A commutator according to claim 1 wherein the initial stepwise increase in the area of contact between said brush and said adjacent segment lies in the range 0.25–0.75 of the maximum area of contact.

3. A commutator according to claim 1 wherein the initial stepwise increase in the area of contact between said brush and said adjacent segment is one half of the maximum area of contact.

4. A commutator according to claim 1 wherein said brush is adapted to react flexibly to contact pressure at each elemental area of contact with said segments.

5. A commutator according to claim 4 wherein said brush comprises an array of elements of carbonised material of small cross-section.

6. A commutator according to claim 5 wherein said brush comprises a stack of carbon fibres so arranged for external current connection that a current path to a portion of the brush which forms a trailing edge contact surface during commutation is of greater resistance than that to the remaining portion of the brush.

7. A rotatable commutator as set forth in claim 1, said mean rate of increase being such that for a designated speed of rotation, mean current density of the area of contact between a trailing edge of said brush and said segment during commutation is substantially constant.

8. A rotatable commutator comprising:

a plurality of conductive segments separated from one another by insulating boundaries, at least one elongated rectangular brush extending in a direction normal to the direction of rotation of the commutator, said brush uniformly bearing on said segments and arranged such that said brush at no time contacts more than two segments simultaneously, and inductance means interconnecting adjacent segments, said inductance means having an inductive time constant during commutation which is at least substantially comparable to the time required for said brush to pass from a given position on one of said segments to a corresponding position on an adjacent one of said segments as the commutator rotates in a predetermined direction, each said insulating boundary having a first boundary portion extending in a direction normal to the direction of commutator rotation and a second boundary portion departing from the direction of said first boundary portion and extending to a point angularly displaced from the direction of said first boundary portion whereby said commutator rotation brings said brush into contact with said adjacent segment initially by passing over the first boundary portion to increase the area of contact between said brush and said adjacent segment in a substantially stepwise manner and subsequently by passing over the second boundary portion to increase said area of contact in a substantially linear manner.

* * * * *

UNITED STATES PATENT AND TRADEMARK OFFICE
CERTIFICATE OF CORRECTION

PATENT NO. : 4,167,685

DATED : September 11, 1979

INVENTOR(S) : James J. Bates

It is certified that error appears in the above-identified patent and that said Letters Patent are hereby corrected as shown below:

In Column 4, line 44, the expression should read:

$(Ja/Jo)_2 = 1/[1 - (T/Tc)(1 - r/r_o)]$

In Column 5, line 40:

delete "tm" to the right hand end of the line.

In Column 6, line 46:

"$R_1 2$" should be -- $R_1/2$ --.

Signed and Sealed this

*Twenty-fifth* Day of *December 1979*

[SEAL]

*Attest:*

SIDNEY A. DIAMOND

*Attesting Officer* *Commissioner of Patents and Trademarks*

UNITED STATES PATENT AND TRADEMARK OFFICE

CERTIFICATE OF CORRECTION

PATENT NO. : 4,167,685

DATED : September 11, 1979

INVENTOR(S) : James J. Bates

It is certified that error appears in the above–identified patent and that said Letters Patent are hereby corrected as shown below:

In Column 4, line 44, the expression should read:

$$(Ja/Jo)_2 = 1/[1 - (T/Tc) \quad (1 - r/r_o)]$$

In Column 5, line 40:

delete "tm" and shift "(2)" to the right hand end of the line.

In Column 6, line 46:

"$R_1 2$" should be --$R_1/2$ --.

THIS CERTIFICATE SUPERSEDES CERTIFICATE OF CORRECTION ISSUED December 25, 1979.

Signed and Sealed this

*Eleventh* Day of *March 1980*

[SEAL]

*Attest:*

SIDNEY A. DIAMOND

*Attesting Officer* *Commissioner of Patents and Trademarks*